Feb. 10, 1931.　　　　　C. H. GRAY　　　　　1,792,298
METHOD OF AND APPARATUS FOR THE VULCANIZATION OF
RUBBER OR LIKE COVERINGS ON HOLLOW ARTICLES
Filed Aug. 22, 1927
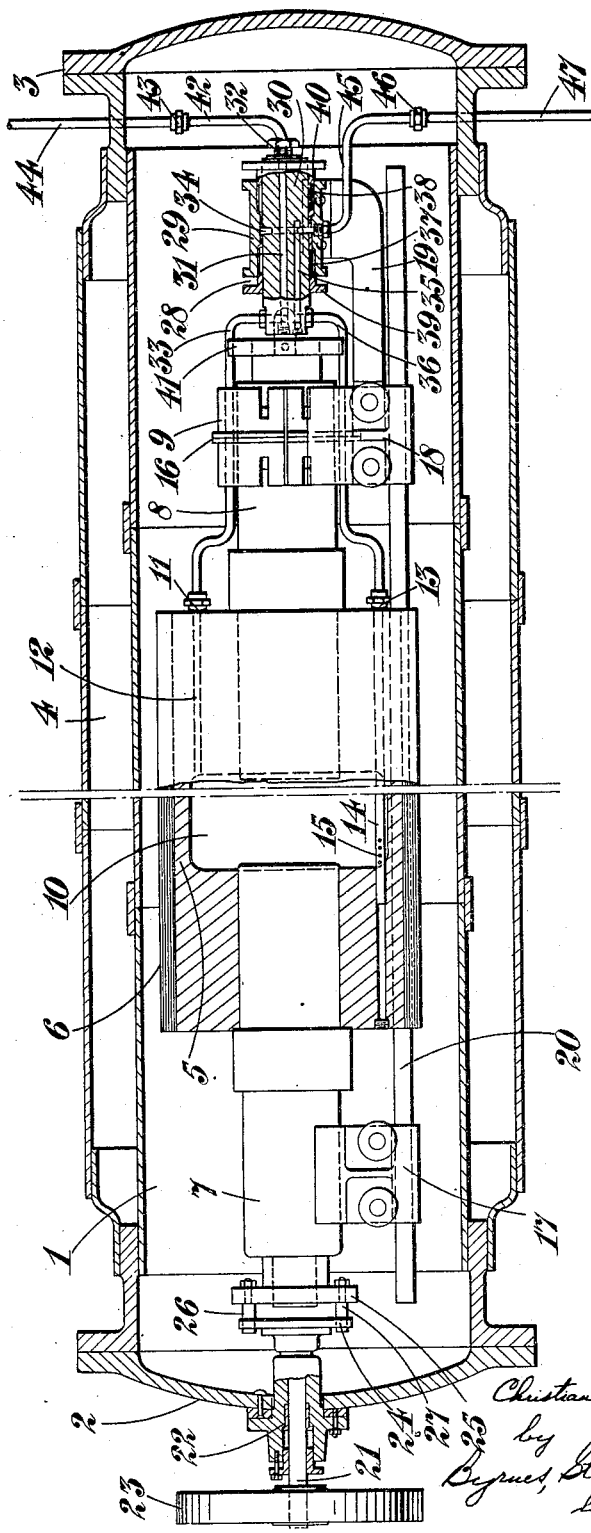
INVENTOR
Christian Hamilton Gray
by
Byrnes, Stebbins & Parmelee
his attorneys Patented Feb. 10, 1931

1,792,298

UNITED STATES PATENT OFFICE

CHRISTIAN HAMILTON GRAY, OF LONDON, ENGLAND

METHOD OF AND APPARATUS FOR THE VULCANIZATION OF RUBBER OR LIKE COVERINGS ON HOLLOW ARTICLES

Application filed August 22, 1927, Serial No. 214,586, and in Great Britain September 24, 1926.

This invention consists in improvements in or relating to method of and apparatus for the vulcanization of rubber or like coverings on hollow metal articles such as, for example, the rubber coverings of press-rollers used in paper-making machines.

A press-roller for paper-making machines generally comprises a hollow cylindrical metal shell to the exterior surface of which is vulcanized a covering of rubber. The said rubber covering usually comprises a base layer of hard rubber adjacent to the metal shell of the roller and a soft rubber layer applied to said base layer. The said soft rubber layer is generally very much thicker than the said base layer of hard rubber.

It is usual for the vulcanization of said rubber coverings, i. e. the base layer plus its softer covering to be carried out by placing the roller in a vulcanizing chamber filled with steam or water under pressure. In the past it has been found practically impossible to vulcanize both the said soft rubber layer and the base layer of hard rubber to the optimum degree throughout the roller. The said base layer, which generally requires a greater amount of heat to vulcanize it to the optimum point than the soft rubber layer, has not received even as much heat as the soft rubber layer, since the hollow interior of the roller having only comparatively small apertures (in some cases none at all) communicating with the exterior takes a very much longer time to heat up.

There is already a known method invented by me of vulcanizing a rubber covering on a hollow roll in a fluid-containing vulcanizing chamber, the said method consisting in circulating the fluid through the interior of the roll during the process of vulcanization, with or without rotating the article in the fluid. The present invention modifies and improves upon the said method which is disclosed in my United States Patent No. 1,551,025, granted August 25, 1925.

According to the present invention the method of vulcanizing a rubber or like covering on a hollow metal article (such as a press-roller for a paper-making machine) comprises surrounding the article with a heat-emitting fluid to act upon the exterior of the covering and while said covering is so subjected, supplying to the interior of the said article a flow of heat-emitting fluid, that is under a control separate from the control of the fluid supplied to said exterior. By making the control thus separate, the course of the flow of heat-emitting fluid supplied to the interior can be regulated, as also can the duration of the supply and its temperature, pressure or character, or any of these characteristics individually, quite independently of the heat-emitting fluid acting upon the exterior of the covering.

Preferably, the hollow metal article is rotated in the heat-carrying fluid with which it is surrounded.

The heat-carrying fluid supplied to the interior of the article is preferably circulated therethrough.

Conveniently the heat-carrying fluid supplied to the interior of the article is a different fluid from the heat-carrying fluid with which the article is surrounded.

Preferably the heat-carrying fluid supplied to the interior of the article has a greater temperature than the heat-carrying fluid with which the article is surrounded; if it has not, then it must be maintained in a more active flow over the interior than over the exterior surface or for a longer duration.

The heat-carrying fluid supplied to the interior of the article may conveniently be a gaseous fluid such as steam, while that with which the article is surrounded may be a liquid such as hot water, preferably at pressure greater that that of the atmosphere.

Conveniently the hollow article is rotated in a vessel or chamber containing a heat-carrying fluid and the heat-carrying fluid supplied to the interior of the article is supplied directly thereto from the exterior of the vessel or chamber.

This invention also includes apparatus for vulcanizing a rubber covering on a hollow metal article, said apparatus comprising the combination with means for so supporting a hollow article within a vessel or chamber that it can be rotated therein, of means arranged to conduct a heat-carrying fluid directly to the interior of said article from the exterior of said vessel or chamber while said article is rotating.

Preferably there is combined with the means arranged to conduct the heat-carrying fluid to the interior of the article means to conduct said fluid from the interior of the article to the exterior of said vessel or chamber, the combined means being operative to circulate the fluid through the interior of the article while said article is rotating.

It is to be understood that the term "hollow article" includes an article having internal channels or passages, the term "interior" in such a case referring to the said channels or passages.

In the preferred way of carrying out this invention as applied to the vulcanization of rubber coverings of cylindrical rollers, such as press-rollers for paper-making machines, the roller is rotated in a vulcanizing chamber containing water under pressure, and steam (at a temperature greater than that of the water) simultaneously circulated through the hollow centre of the roller.

The accompanying drawing illustrates a convenient form of apparatus according to this invention for carrying out in the above-mentioned preferred way the method of this invention as applied to the vulcanization of rubber coverings of cylindrical rollers. The said drawing is a longitudinal section of a vulcanizing chamber with a roller positioned therein, the said roller being shown partly in longitudinal section.

Referring to the drawing, 1 indicates the cylindrical vulcanizing chamber which has end doors 2 and 3 and an outer surrounding steam-jacket 4. In use the chamber 1 is filled with water under pressure through conduits which are not shown in the drawing. A hollow cylindrical roller 5 having a rubber covering 6 is shown positioned in the chamber for vulcanization purposes, the said roller having end-shafts 7 and 8 by which it is rotatably supported on bearing blocks on suitable carriages 17 and 18. The said carriages are mounted to run on guide rails 20 which extend the length of the chamber, so that the roller can be handled thereon in and out of the chamber. A sleeve 9 is secured around the end-shaft 8 between said shaft and the bearing blocks upon which it rotates, for the purpose hereinafter referred to.

Extending through the door 2 of the chamber is a driving spindle 21 which is mounted rotatably in said door in a gland 22. The outer end of said spindle has a driving pulley 23 secured thereto while the inner end carries a driving cross-arm 24. Secured to the extremity of the end-shaft 7 of the roller is a driving-head 25 having pins 26 and 27 which are engaged by the aforesaid driving cross-arm 24 so that the roller is revolved upon rotation of the pulley 23.

Carried by a bracket 19 extending from the carriage 18 is a steam distribution box 28 by which steam is passed from and to stationary pipes to and from the interior 10 of the rotating roller. The box 28 comprises a hollow outer member 29 secured to the bracket 19 said outer member having a cylindrical interior and surrounding a cylindrical inner member 18 which rotates in said outer member 29, and projects therebeyond adjacent the end-shaft 8. The box 28 is carried by the said bracket 19 so that the inner member 30 is coaxial with the roller 5 and so that the projecting end of said member is close to the extremity of said end-shaft 8. The inner member 30 is connected to the end-shaft 8 so as to rotate therewith by means of a link shown in dotted lines which is bolted to said member 30 and extends thereto from a clip 41 secured to the extremity of the end-shaft 8.

Extending along the axis of the member 30 is a passage 31 which communicates, at the end of said member which is away from the roller, through a gland 32, with a fixed conduit 42 so that the inner member rotates steam-tight in relation thereto. The conduit 42 is connected by a union 43 to a conduit 44 which passes through the wall of the chamber 1. The passage 31 is plugged at the end adjacent the end-shaft 8 and communicates through a passage at right angles therewith adjacent said plugged end with a conduit 33 secured in the side of the aforesaid projecting end of the member 30. The conduit 33 extends to and is connected at 11 with the side of the roller 5 and communicates with the hollow centre 10 thereof through a passage through a channel 12 therein.

Extending around the cylindrical face of the member 30 is a circular channel 34 which is open to a hole in the interior face of the outer member 29 said hole communicating with a conduit 45 secured in said outer member. The conduit 45 is connected through a union 46 with a conduit 47 which passes through the wall of the chamber 1. Extending in said member 30 from said channel 34 is a passage 35 which lies parallel to and is spaced from the aforesaid passage 31. The end of the passage 35 adjacent the roller is plugged and communicates through a passage at right angles thereto adjacent said plugged end with a conduit 36 secured in the projecting end of said member opposite to the aforesaid conduit 34. The conduit 36 is connected at 13 to the side of the roller 5 and communicates thereat with a conduit 14 which extends therefrom through the hollow interior of the roller to the opposite end thereof, where holes 15 in said conduit communicate with the hollow interior of the roller.

In passing from the inner member 30 to the side of the roller 5 the conduits 33 and 36 pass between the aforesaid sleeve 9 and the end-shaft 8 of the roller, said conduits lying in grooves in the inner surface of said sleeve which thereby serves to provide a suitable surface for rotation on the carriage 30 and also provides means for holding the conduits in position against said end-shaft. The flange 16 on said sleeve 9 registers with a groove in the bearing blocks on the carriage 18 and serves to locate the roller relatively thereto.

In order to ensure a close steam-tight joint between the outer member 29 and the inner member 30, glands 37 and 38 are provided at the ends of the outer member 29 the flanges 39 and 40 of said glands being secured to the outer member 29 by bolts which are not shown.

It will be appreciated that the arrangement described permits steam or other fluid to be supplied to and received from the interior of the roller while it is rotating. Either of the conduits 44 and 47 may be used for steam supply, the other being used as the steam drain or exhaust. It will further be appreciated that since the said conduits communicate with opposite ends of the interior of the roller, the fluid supplied to said interior circulates therethrough before leaving said interior.

Instead of the channel 34 being around the inner member 30 it may be around the interior cylindrical face of the outer member 29 being open to a hole or passage in the inner member 30. Alternatively, both the inner and outer members may have channels around the adjacent cylindrical faces, the said channels being opposite to each other.

Instead of surrounding the article with hot water and circulating steam through the interior thereof it may be desirable in some cases to surround the article with steam. In such a case it might be convenient for the means conducting the steam to the interior of the article to be connected to the supply conduit which supplies the steam to the interior of the vessel or chamber in which the article is positioned.

Many modifications may be made in the method and apparatus described and other apparatus devised for carrying out the method of the invention without departing from the scope of the invention as defined in the appended claims.

I claim:—

1. In apparatus for vulcanizing a rubber coating on a hollow metal article, the combination of a container, means to rotatably support said article so as to form in itself a partition in the container and to provide two separate and unconnected chambers, one within and one without the article respectively, a trunnion through which a heat-emitting fluid passes, a trunnion-bearing for the said trunnion, cooperating conduits in the trunnion and in the trunnion-bearing and employed for supply and exhaust fluid and open as to those in the trunnion into those in the bearing.

2. In apparatus for vulcanizing a rubber covering on a hollow metal article, the combination of a container, means to rotatably support said article so as to form in itself a partition in the container and to provide two separate and unconnected chambers, one within and one without the article respectively, a trunnion which is a conduit for fluid, a trunnion-bearing for the said trunnion, cooperating conduits in the trunnion and in the trunnion-bearing and employed for supply and exhaust fluid and open as to those in the trunnion into those in the bearing.

3. In apparatus for vulcanizing a rubber coating on a hollow metal article, the combination of a container, a support wherein a hollow metal article is rotatable, a trunnion through which a heat-emitting fluid passes, a trunnion-bearing for the said trunnion, circular conduits co-axial with the trunnion and employed for supply and exhaust fluid and formed in the face of the trunnion and also in the face of the trunnion-bearing and open as to those in the trunnion into those in the bearing.

4. In apparatus for vulcanizing a rubber covering on a hollow metal article, the combination of a container, a support in which a hollow metal article is rotatable, a trunnion which is a conduit for fluid, a trunnion-bearing for the said trunnion, circular conduits for fluid coaxial with the trunnion formed in a face of the trunnion and also in the contiguous face of the trunnion-bearing and open as to those circular conduits in the trunnion into those in the bearing.

5. In apparatus for vulcanizing a rubber covering on a hollow metal article, the combination of a container, a support in which a hollow metal article is rotatable, a trunnion having two horizontally disposed conduits for fluid, the one centrally disposed within said trunnion and the other eccentrically disposed, and having a circular conduit for fluid coaxial with said trunnion and formed in its face, said circular conduit being open to said eccentrically disposed conduit, and a trunnion-bearing having a circular conduit for fluid formed in its face, said conduit in the trunnion-bearing being open to the circular conduit in the trunnion.

6. A method of manufacturing a hollow cylindrical metal article comprising a shell and a covering of rubber vulcanized thereto, which consists in mounting the article in a container in such a manner so as to form in itself a partition therein and to provide separate and unconnected chambers, one within and one without the article respectively, supplying each chamber with a separately controlled flow of heat-emitting fluid, and while said chambers are so supplied, rotating the hollow cylindrical metal article.

7. In apparatus for manufacturing a hollow cylindrical metal article comprising a shell and a covering of rubber vulcanized thereto, the combination of a container, means to rotatably support said article so as to form in itself a partition in the container and to provide two separate and unconnected chambers one within and one without the article respectively, means to supply heat-emitting fluid to the container outside the article, and means to deliver to the interior of the article a heat-emitting fluid which is of a supply separate from the aforesaid.

8. In apparatus for manufacturing a hollow cylindrical metal article comprising a shell and a covering of rubber vulcanized thereto, the combination of a container, a trunnioned rotatable member for connection to a hollow rotatable article forming in itself a partition in the container and providing two separate and unconnected chambers, one within and one exterior of the article respectively, means to supply heat-emitting fluid to the container and means to deliver to the interior of the hollow metal article through the trunnion a heat-emitting fluid which is of a supply separate from the aforesaid.

In testimony whereof I affix my signature.

CHRISTIAN HAMILTON GRAY.